(12) United States Patent
Ziemer et al.

(10) Patent No.: US 11,261,943 B2
(45) Date of Patent: Mar. 1, 2022

(54) PLANET-TYPE MULTI-STAGE TRANSMISSION FOR A BICYCLE OR PEDELEC

(71) Applicant: ZF Friedrichshafen AG, Friedrichshafen (DE)

(72) Inventors: Peter Ziemer, Tettnang (DE); Christoph Margraf, Markdorf (DE); Thomas Riedisser, Sigmarszell (DE); Ulrich Doerr, Constance (DE); Kim Führer, Lindau (DE); Hagen Doepfert, Lindau (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 0 days.

(21) Appl. No.: 17/058,846

(22) PCT Filed: Apr. 29, 2019

(86) PCT No.: PCT/EP2019/060852
§ 371 (c)(1),
(2) Date: Nov. 25, 2020

(87) PCT Pub. No.: WO2019/228726
PCT Pub. Date: Dec. 5, 2019

(65) Prior Publication Data
US 2021/0207689 A1    Jul. 8, 2021

(30) Foreign Application Priority Data
May 28, 2018    (DE) .................. 10 2018 208 380.0

(51) Int. Cl.
*F16H 3/66*    (2006.01)
*B62M 11/18*    (2006.01)
*F16H 3/72*    (2006.01)

(52) U.S. Cl.
CPC ............ *F16H 3/666* (2013.01); *B62M 11/18* (2013.01); *F16H 3/663* (2013.01); *F16H 3/725* (2013.01);
(Continued)

(58) Field of Classification Search
CPC ....... B62M 11/14–18; F16H 2200/2071–2076; F16H 2200/2087–2092; F16H 2200/201–2017
See application file for complete search history.

(56) References Cited

U.S. PATENT DOCUMENTS 5,069,656 A * 12/1991 Sherman ................ B60K 17/06
475/276
5,435,792 A * 7/1995 Justice ...................... F16H 3/66
475/275
(Continued)

FOREIGN PATENT DOCUMENTS

DE    102016225157 A1    6/2018
TW    200906673 A    2/2009
(Continued)

OTHER PUBLICATIONS

International Search Report (English Translation) PCT/EP2019/060852, dated Jul. 22, 2019. (2 pages).
(Continued)

*Primary Examiner* — Ernesto A Suarez
*Assistant Examiner* — James J Taylor, II
(74) *Attorney, Agent, or Firm* — Dority & Manning, P.A.

(57) ABSTRACT

A multi-stage planetary transmission for a bicycle or a pedelec includes a transmission input shaft (1), a transmission output shaft (2), and at least three planetary gear sets (VRS, VR1, VR2, RS1, RS2, NRS, NR1, NR2). A first planetary gear set (RS1) and a second planetary gear set (RS2) are configured as a main gear set and at least one (Continued)

further planetary gear set (VRS, VR1, VR2, NRS, NR1, NR2) is configured as a front-mounted gear set and/or as a rear-mounted gear set. At least three free-wheel clutches (F1, F2, F3, F4) and at least three brakes (B1, B2, B3, B4) are provided for implementing at least eight gears (G1, G2, G3, G4, G5, G6, G7, G8, G9, G10, G11, G12, G13, G14, G15, G16). Moreover, the multi-stage transmission may be a bottom bracket transmission. In addition, a bicycle or pedelec with the multi-stage transmission is proposed.

25 Claims, 11 Drawing Sheets

(52) U.S. Cl.
CPC ............... *F16H 2200/006* (2013.01); *F16H 2200/0078* (2013.01); *F16H 2200/2012* (2013.01); *F16H 2200/2046* (2013.01); *F16H 2200/2051* (2013.01); *F16H 2200/2087* (2013.01); *F16H 2200/2089* (2013.01)

(56) References Cited

U.S. PATENT DOCUMENTS

| | | | |
|---|---|---|---|
| 10,641,386 B2* | 5/2020 | Fujii | F16H 3/66 |
| 2011/0177911 A1 | 7/2011 | Serkh et al. | |
| 2013/0217534 A1* | 8/2013 | Kirchhoffer | F16H 3/66 |
| | | | 475/276 |
| 2014/0361511 A1 | 12/2014 | Thompson | |
| 2020/0086950 A1 | 3/2020 | Griesmeier et al. | |

FOREIGN PATENT DOCUMENTS

| | | |
|---|---|---|
| TW | 201542418 A | 11/2015 |
| WO | WO 2014/072344 | 5/2014 |

OTHER PUBLICATIONS

German Search Report DE102018208380.0, dated Feb. 13, 2019. (12 pages).

\* cited by examiner

Fig. 4

Shift Logic

| Gear | B3 | B2 | B1 | B4 | F1 | F2 | F3 | F4 | i | φ |
|---|---|---|---|---|---|---|---|---|---|---|
| G1  | – | – | – | – | • | • | • | • | 1.0  | 1.13 |
| G2  | – | – | • | – | – | • | • | • | 0.89 | 1.13 |
| G3  | – | • | – | – | • | – | • | • | 0.79 | 1.13 |
| G4  | – | • | • | – | – | – | • | • | 0.70 | 1.13 |
| G5  | • | – | – | – | • | • | – | • | 0.62 | 1.13 |
| G6  | • | – | • | – | – | • | – | • | 0.55 | 1.13 |
| G7  | • | • | – | – | • | – | – | • | 0.49 | 1.13 |
| G8  | • | • | • | – | – | – | – | • | 0.43 | 1.13 |
| G9  | – | – | – | • | • | • | • | – | 0.38 | 1.13 |
| G10 | – | – | • | • | – | • | • | – | 0.34 | 1.13 |
| G11 | – | • | – | • | • | – | • | – | 0.30 | 1.13 |
| G12 | – | • | • | • | – | – | • | – | 0.27 | 1.13 |
| G13 | • | – | – | • | • | • | – | – | 0.24 | 1.13 |
| G14 | • | – | • | • | – | • | – | – | 0.21 | 1.13 |
| G15 | • | • | – | • | • | – | – | – | 0.19 | 1.13 |
| G16 | • | • | • | • | – | – | – | – | 0.16 | $\varphi_{ges}=6.1$ |

• engaged
– disengaged

– Overrun operation condition
• Locking direction condition

| Gear | B3 | B2 | B1 | B4 | F1 | F2 | F3 | F4 | i | φ |
|---|---|---|---|---|---|---|---|---|---|---|
| G1  | – | – | – | – | ● | ● | ● | ● | 1.0  |      |
| G2  | – | – | ● | – | – | – | ● | ● | 0.93 | 1.08 |
| G3  | – | ● | – | – | ● | – | ● | ● | 0.86 | 1.08 |
| G4  | – | ● | ● | – | – | – | ● | ● | 0.79 | 1.08 |
| G5  | ● | – | – | – | ● | ● | – | ● | 0.73 | 1.08 |
| G6  | ● | – | ● | – | – | ● | – | ● | 0.68 | 1.08 |
| G7  | ● | ● | – | – | ● | – | – | ● | 0.63 | 1.08 |
| G8  | ● | ● | ● | – | – | – | – | ● | 0.58 | 1.08 |
| G9  | – | – | – | ● | ● | ● | ● | – | 0.54 | 1.08 |
| G10 | – | – | ● | ● | – | ● | ● | – | 0.49 | 1.08 |
| G11 | ● | – | – | ● | ● | – | ● | – | 0.46 | 1.08 |
| G12 | ● | – | ● | ● | – | – | ● | – | 0.42 | 1.08 |
| G13 | ● | ● | – | ● | ● | ● | – | – | 0.39 | 1.08 |
| G14 | ● | ● | ● | ● | – | ● | – | – | 0.36 | 1.08 |
| G15 | ● | ● | – | ● | ● | – | – | – | 0.34 | 1.08 |
| G16 | ● | ● | ● | ● | – | – | – | – | 0.31 | 1.08 |

φ_ges = 3.2

● engaged
– disengaged

| Overrun operation condition
● Locking direction condition

Fig. 7

| Gear | B3 | B2 | B1 | F3 | F2 | F1 | i | φ |
|------|----|----|----|----|----|----|------|------|
| G1 | – | – | – | ● | ● | ● | 1.0 | 1.13 |
| G2 | – | – | ● | ● | ● | – | 0.89 | 1.13 |
| G3 | – | ● | – | ● | – | ● | 0.79 | 1.13 |
| G4 | ● | ● | ● | – | – | – | 0.79 | 1.13 |
| G5 | ● | – | – | – | ● | ● | 0.62 | 1.13 |
| G6 | ● | – | ● | – | ● | – | 0.55 | 1.13 |
| G7 | ● | ● | – | – | – | ● | 0.49 | 1.13 |
| G8 | ● | ● | ● | – | – | – | 0.43 | $\varphi_{ges}=2.3$ |

● engaged
– disengaged

– Overrun operation condition
● Locking direction condition

Fig. 9

| Gear | B4 | B3 | B2 | F4 | F3 | F2 | i | φ |
|---|---|---|---|---|---|---|---|---|
| G1 | – | – | – | ● | ● | ● | 1.0 | |
| G2 | – | – | ● | ● | ● | – | 0.79 | 1.27 |
| G3 | – | ● | – | ● | – | ● | 0.62 | 1.27 |
| G4 | – | ● | ● | ● | ● | – | 0.49 | 1.27 |
| G5 | ● | – | – | – | ● | ● | 0.38 | 1.27 |
| G6 | ● | – | ● | – | ● | – | 0.30 | 1.27 |
| G7 | ● | ● | – | – | – | ● | 0.24 | 1.27 |
| G8 | ● | ● | ● | – | – | – | 0.19 | 1.29 |

$\varphi_{ges} = 5.3$

● engaged
– disengaged

—— Overrun operation condition
●  Locking direction condition

Fig. 11

PLANET-TYPE MULTI-STAGE TRANSMISSION FOR A BICYCLE OR PEDELEC

CROSS-REFERENCE TO RELATED APPLICATIONS

The present application is related and has right of priority to German Patent Application No. 10 2018 208 380.0 filed on May 28, 2018 and to PCT Publication No. WO 2019/228726 filed on Apr. 29, 2019, both of which are incorporated by reference in their entirety for all purposes.

FIELD OF THE INVENTION

The invention relates generally to a multi-stage transmission of a planetary design for a bicycle or pedelec. In addition, the invention relates generally to a bicycle or a pedelec including the multi-stage transmission.

BACKGROUND

Multiple bicycles and pedelecs are known from the prior art, which are usually equipped with derailleur gears or hub gears. Pedelecs differ from bicycles in that an electric machine is provided, which assists the rider. In the case of pedelecs, in some applications, a hub motor is installed in the front wheel or the rear wheel. Hub motors in the front wheel have an unfavorable effect on the handling characteristics due to the high weight. By comparison, hub motors arranged in the rear wheel have previously been utilized with derailleur gears, which are difficult to maintain, and also have an unfavorable effect on the handling characteristics due to the high weight. For this reason, pedelecs have already been developed, in which a transmission of a countershaft design and an electric motor are arranged in a bottom bracket. The disadvantage of the known bottom bracket transmissions of a countershaft design is that these have a low power density and, in addition, a poor efficiency due to the fact that only rolling power occurs.

SUMMARY OF THE INVENTION

Example aspects of the present invention provide a multi-stage transmission and/or a bicycle or a pedelec including the multi-stage transmission, which have a high power density and a high efficiency in combination with a high number of gears.

Accordingly, a multi-stage transmission of a planetary design is proposed, for example, as a bottom bracket transmission for a bicycle or a pedelec, with a transmission input shaft as the input, for example, a manual drive shaft or pedal crankshaft, or the like, and a transmission output shaft as the output, preferably arranged coaxially to the transmission input shaft. The multi-stage transmission or bottom bracket transmission includes at least three planetary gear sets preferably arranged coaxially to the transmission input shaft, wherein a first planetary gear set and a second planetary gear set are designed as a main gear set, and at least one further planetary gear set is designed as a front-mounted gear set and/or as a rear-mounted gear set. Moreover, at least three free-wheel clutches and at least three brakes are provided, which, for example, are also implementable as free-wheel brakes, or the like, in order to implement at least eight gears. In the case of the multi-stage transmission according to example aspects of the invention, a planet carrier of the first planetary gear set is connected to a sun gear of the second planetary gear set, wherein a ring gear of the first planetary gear set is fixable via a second brake and is connectable via a second free-wheel clutch to a planet carrier of the second planetary gear set or to a ring gear of the second planetary gear set. Moreover, the planet carrier of the second planetary gear set is connected to the transmission input shaft or to a gear set element as the output of a front-mounted gear set. In addition, the ring gear of the second planetary gear set is connected to the transmission output shaft or to a gear set element as the input of a rear-mounted gear set. Either a sun gear of the first planetary gear set is fixable via a first brake and connectable via a first free-wheel clutch to the planet carrier of the second planetary gear set or to the ring gear of the second planetary gear set, or the sun gear of the first planetary gear set is connected to the planet carrier of the second planetary gear set or to the ring gear of the second planetary gear set.

In this way, a gear set arrangement for the multi-stage transmission is implemented, which, due to the interconnection of the gear sets, implements a particularly high power density in combination with the highest possible efficiency, and so, therefore, a high system integration is implemented, regardless of the axial sequence, in which the individual planetary gear sets are arranged as a main gear set, a front-mounted gear set, or a main shift gear set.

In example aspects of the present invention, the planetary gear sets of the front-mounted gear sets or of the rear-mounted gear sets can be designed as a negative or minus planetary gear set or as a positive or plus planetary gear set. *A minus* planetary gear set can preferably be transferred into a plus planetary gear set when the planet carrier connection and the ring gear connection to this gear set are interchanged with one another and the value of the stationary transmission ratio is increased by one (1). As is known, a minus planetary gear set includes planet gears, which are rotatably mounted on a planet carrier and intermesh with the sun gear and the ring gear of this planetary gear set, and so, with the planet carrier held and the sun gear rotating, the ring gear rotates in the direction of rotation counter to that of the sun gear. As is known, a plus planetary gear set includes inner and outer planet gears, which are rotatably mounted on a planet carrier and are in tooth engagement with one another, wherein the sun gear of this planetary gear set intermeshes with the inner planet gears, and the ring gear of this planetary gear set intermeshes with the outer planet gears, and so, with the planet carrier held and the sun gear rotating, the ring gear rotates in the same direction of rotation as the sun gear.

For a person skilled in the art, this means that, in the case of the front-mounted gear sets and the rear-mounted gear sets designed as a minus gear set, a first gear set element, as the input, is a planet carrier, a second gear set element, as the output, is a sun gear or a ring gear, and a third gear set element fixed via a third brake or a fourth brake is the remaining ring gear or the remaining sun gear. Moreover, this means that, in the case of the front-mounted gear sets and the rear-mounted gear sets designed as a plus gear set, a first gear set element, as the input, is a ring gear, a second gear set element, as the output, is a sun gear or a planet carrier, and a third gear set element fixed via a third brake or a fourth brake is the remaining sun gear or the remaining planet carrier.

Moreover, in the case of the front-mounted gear sets and in the case of the rear-mounted gear sets, the interlock of the first gear set element with the second gear set element or of the first gear set element with the third gear set element or of the second gear set element with the third gear set element can be implemented via the particular associated third or fourth free-wheel clutch.

So-called intermediate shafts are utilized in the proposed multi-stage transmission for the mechanical connection between a front-mounted gear set and the main shift gear set or for the connection between two front-mounted gear sets. These intermediate shafts are also provided for the mechanical connection between the main shift gear set and the rear-mounted gear set or even between the rear-mounted gear sets with one another. In the case of the multi-stage transmission according to example aspects of the invention, in one example embodiment with three gear sets, only one intermediate shaft is necessary, while, in the embodiment with four gear sets, two intermediate shafts are provided.

Moreover, shafts or shaft-like elements are utilized for connecting the various gear set elements of the provided planetary gear sets. The term shaft is not intended to exclusively mean a cylindrical, rotatably mounted machine element for transmitting torques, but rather general connecting elements, which connect the individual gear set elements to one another, are also intended to be included.

In order to also allow for an electrical assistance power in addition to the manual drive by the rider, it can be provided with respect to the multi-stage transmission according to example aspects of the invention that at least one electric machine, or the like, is provided.

The electric machine can be connected, for example, at the transmission input shaft, the transmission output shaft, and/or at the intermediate shafts directly or even via one or multiple gear stages, chains, toothed belts, or the like. For this purpose, a shift element, such as a free-wheel clutch, or the like, can also be utilized, if necessary. This yields the advantage that, during the pedaling with the electric machine drive switched off, no drag torques occur due to an electric machine driven by the pedaling. In the case of a connection, for example, via a gear stage, a speed reducing ratio can be implemented, if necessary.

In the case of a connection of the electric machine at the transmission input shaft, the electric machine is driven with each of the gear ratios. In the case of the connection of the electric machine at the transmission output shaft, the electric machine EM is operated with the chainring/cog ratio in each case, wherein, as a result, a powershift could be implemented if, during a gear shift, the load is applied exclusively by the electric machine and the transmission is in a no-load condition.

In the example embodiment of the multi-stage transmission as a bottom bracket drive, a free-wheel unit can be preferably implemented between the bottom bracket crankshaft and the transmission input. This yields the advantage that a connected electric machine can continue to rotate without the pedals of the bottom bracket crankshaft rotating.

The provided brakes can also be designed as engageable free-wheel clutches and/or free-wheel brakes, as described above, which has the advantage that a faster and simpler skipping of individual gears during shifting is made possible.

A further example aspect of the present invention is that of also providing a bicycle or a pedelec, or the like, with the above-described multi-stage transmission, wherein the above-described advantages and further advantages result.

BRIEF DESCRIPTION OF THE DRAWINGS

The present invention is explained in greater detail in the following with reference to the drawings. Wherein:

FIG. 4 shows a shift pattern for the first, second, and third embodiment variants of the multi-stage transmission;

FIG. 7 shows a shift pattern for the fourth and fifth embodiment variants of the multi-stage transmission;

FIG. 9 shows a shift pattern for the sixth embodiment variant of the multi-stage transmission;

FIG. 11 shows a shift pattern for the seventh embodiment variant of the multi-stage transmission.

DETAILED DESCRIPTION

Figure 1:
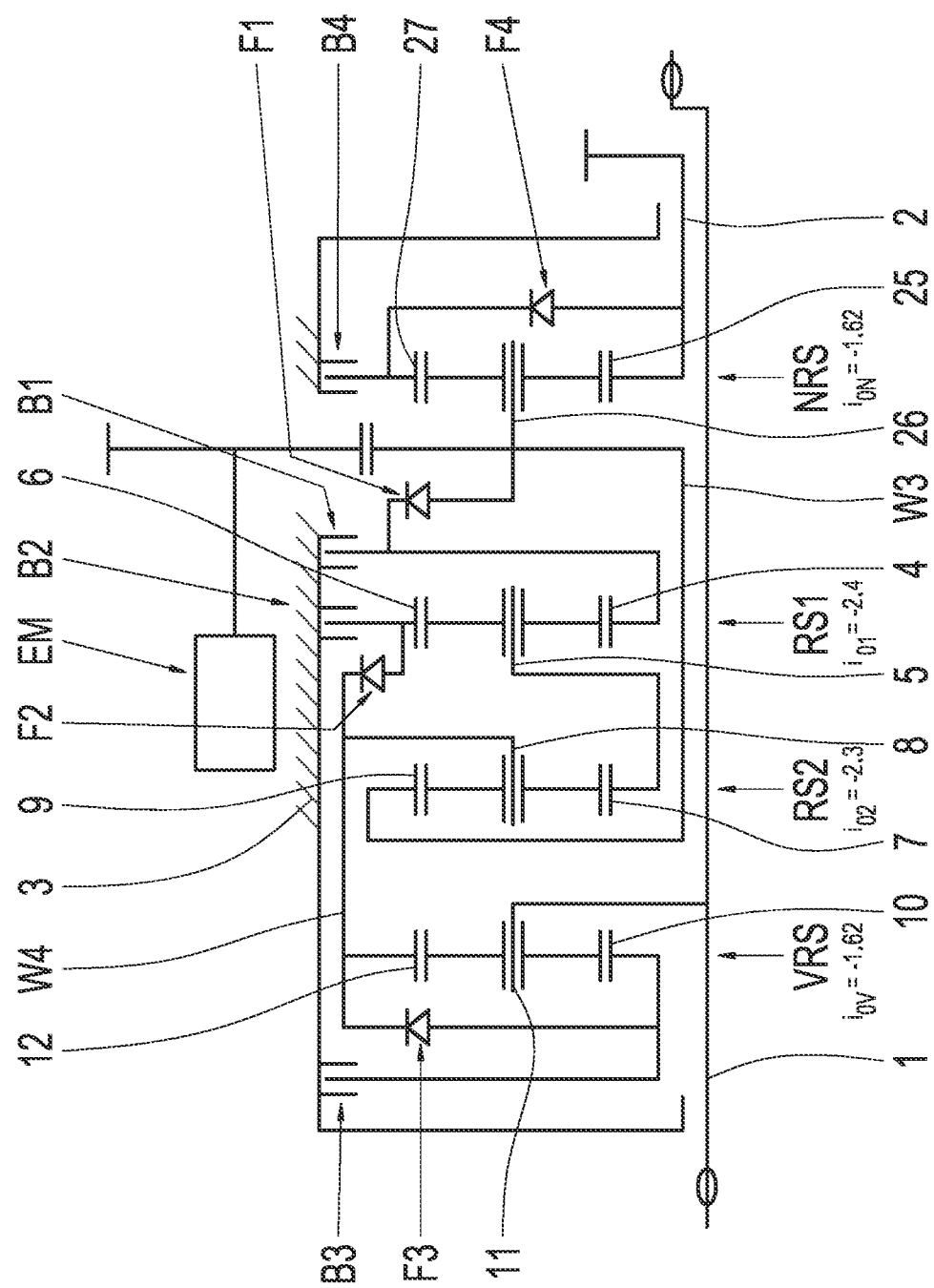
FIG. 1 shows a diagrammatic view of a first embodiment variant of a multi-stage transmission according to the invention with a front-mounted gear set ahead of and a rear-mounted gear set behind the main shift gear set, as a 16-speed variant.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

In FIGS. 1 through 11, different example embodiment variants of a multi-stage transmission according to the invention are represented, by way of example, as a bottom bracket drive of a coaxial design with the particular stationary transmission ratios i0 of the individual gear sets, wherein the particular shift patterns indicate the possible gears G1 through G16 with the associated ratio i and the stepping and/or the overall gear ratio φ. In the shift patterns according to FIGS. 4, 7, 9, and 11, the individual conditions of the brakes B1, B2, B3, B4 and of the free-wheel clutches F1, F2, F3, F4 are indicated, wherein, with respect to the brakes B1, B2, B3, B4, a dot indicates the engaged condition and a dash indicates the disengaged condition, while, with respect to the free-wheel clutches F1, F2, F3, F4, a dot indicates the locking direction condition and a dash indicates the overrun operation condition. The overrun operation and/or the overrun operation condition of a free-wheel unit means that the free-wheel unit does not lock. The free-wheel unit can be in an overrun operation when one of the elements connected to the free-wheel unit rotates so quickly that the free-wheel unit cannot lock. The locking direction condition of a free-wheel unit means that the free-wheel unit locks.

Regardless of the particular example embodiment variant of the multi-stage transmission, it is provided that the multi-stage transmission of a planetary design is usable for a bicycle, a pedelec, or the like. The multi-stage transmission includes a transmission input shaft 1 as the input, which is designed, for example, as a pedal crankshaft in the figures, and a transmission output shaft 2 as the output, which can be designed, for example, as a sprocket or a toothed belt pulley. Depending on the example embodiment variant, the multi-stage transmission includes at least three planetary gear sets VRS, VR1, VR2, RS1, RS2, NRS, NR1, NR2, wherein a first planetary gear set RS1 and a second planetary gear set RS2 are designed as a main shift gear set, wherein at least one further planetary gear set VRS, VR1, VR2, NRS, NR1, NR2 is designed as a front-mounted gear set and/or as a rear-mounted gear set. In addition, at least three free-wheel clutches F1, F2, F3, F4 and at least three brakes or free-wheel brakes B1, B2, B3, B4 are provided as shift elements in order to implement at least eight (8) gears.

In all example embodiment variants of the multi-stage transmission, it is provided with respect to the main shift gear set that a planet carrier 5 of the first planetary gear set RS1 is connected to a sun gear 7 of the second planetary gear set RS2, wherein a ring gear 6 of the first planetary gear set RS1 is fixable on the housing side via a second brake B2 and is connectable via a second free-wheel clutch F2 to a planet carrier 8 of the second planetary gear set RS2 or to a ring gear 9 of the second planetary gear set RS2. The planet carrier 8 of the second planetary gear set RS2 is connected via an intermediate shaft W3, W4 to the transmission input shaft 1 or to a gear set element as the output of a front-mounted gear set VR1, VRS. The ring gear 9 of the second planetary gear set RS2 is connected via an intermediate shaft W3, W4 to the transmission output shaft 2 or to a gear set element as the input of a rear-mounted gear set NRS, NR1. A sun gear 4 of the first planetary gear set RS1 is either fixable via a first brake B1 and connectable via a first free-wheel clutch F1 to the planet carrier 8 of the second planetary gear set RS2 or to the ring gear 9 of the second planetary gear set RS2, or the sun gear 4 of the first planetary gear set RS1 is connected to the planet carrier 8 of the second planetary gear set RS2 or to the ring gear 9 of the second planetary gear set RS2.

A first example embodiment variant of the multi-stage transmission as a sixteen-speed (16-speed) variant is represented in FIG. 1, in which, in axial sequence, a front-mounted gear set VRS is provided as a negative or minus planetary gear set, the second planetary gear set RS2 is provided as a minus planetary gear set, the first planetary gear set RS1 is provided as a minus planetary gear set, and a rear-mounted gear set NRS is provided as a minus planetary gear set. Moreover, the stationary transmission ratio $i_{0V}$ of the front-mounted gear set VRS, the stationary transmission ratio $i_{02}$ of the second planetary gear set RS2, the stationary transmission ratio $i_{01}$ of the first planetary gear set RS1, and the stationary transmission ratio $i_{0N}$ of the rear-mounted gear set NRS are indicated in FIG. 1.

In detail, it is provided in the first example embodiment variant that the transmission input shaft 1 is connected to the planet carrier 11 of the front-mounted gear set VRS. The sun gear 10 of the front-mounted gear set VRS is fixable and/or connectable to the housing 3 via the third brake B3 and is connectable via a third free-wheel clutch F3 to the ring gear 12 of the front-mounted gear set VRS as well as to the planet carrier 8 of the second planetary gear set RS2 and, via the second free-wheel clutch F2 of the second planetary gear set RS2, to the ring gear 6 of the first planetary gear set RS1.

The ring gear 9 of the second planetary gear set RS2 is connected to the planet carrier 26 of the rear-mounted gear set NRS and to the electric machine EM and is connectable via the first clutch F1 to the sun gear 4 of the first planetary gear set RS1. The sun gear 7 of the second planetary gear set RS2 is connected to the planet carrier 5 of the first planetary gear set RS1, wherein the ring gear 27 of the rear-mounted gear set NRS is fixable via the fourth brake B4 and is connectable via the fourth free-wheel clutch F4 to the transmission output shaft 2, and wherein the sun gear 25 of the rear-mounted gear set NRS is connected to the transmission output shaft 2.

The gear set arrangement of the multi-stage transmission according to the first example embodiment variant allows for a large overall gear ratio with the multi-stage transmission, and so the utilization, preferably for off-road bicycles, such as MTBs, is particularly advantageous. Moreover, it is made possible that the electric machine EM operatively connected to the intermediate shaft W3 is advantageously operated with the ratio i=1 in the gears G1 through G8 and with the ratio i=0.38 in the gears G9 through G16, which results from the associated shift pattern according to FIG. 4. If, in the first example embodiment variant according to FIG. 1, the rear-mounted gear set NRS and the fourth free-wheel clutch F4 associated with the rear-mounted gear set NRS are omitted, an eight-speed (8-speed) variant of the multi-stage transmission results.

Figure 2:
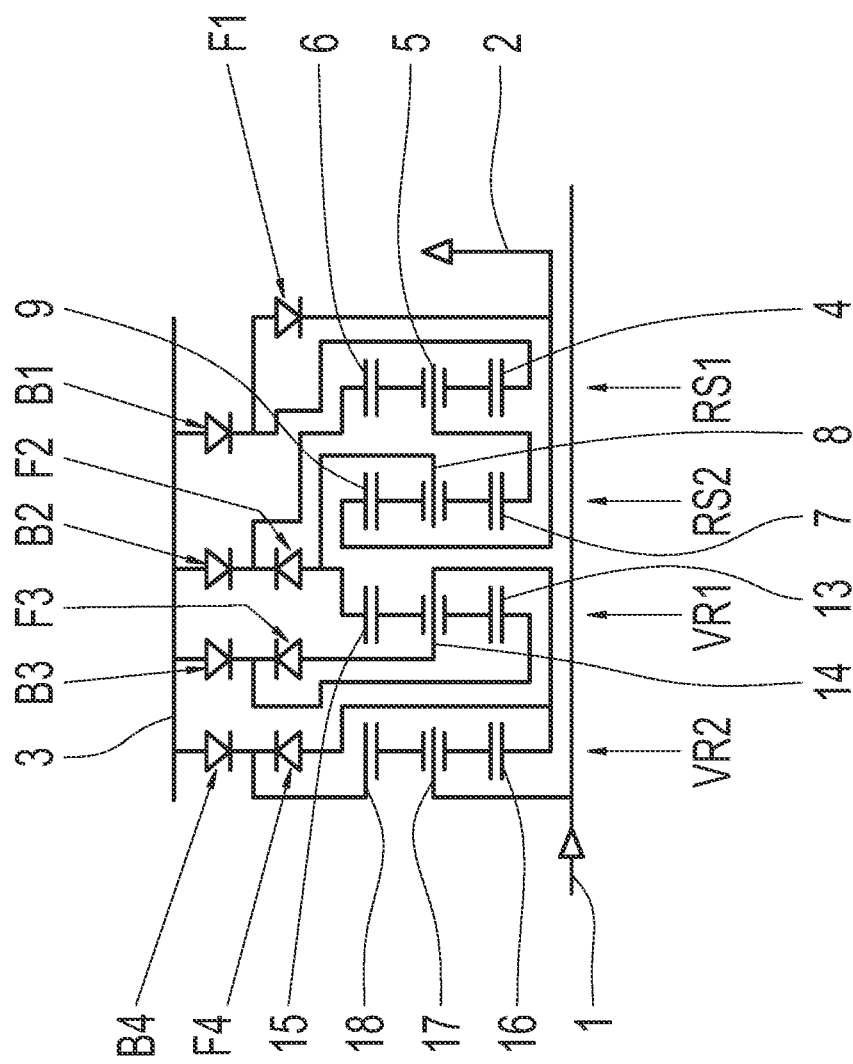
FIG. 2 shows a diagrammatic view of a second embodiment variant of the multi-stage transmission with two front-mounted gear sets ahead of the main shift gear set, as a 16-speed variant.

In FIG. 2, a second example embodiment variant of the multi-stage transmission as a sixteen-speed (16-speed) variant is shown, in which, in axial sequence, a second front-mounted gear set VR2 is provided as a negative or minus planetary gear set, a first front-mounted gear set VR1 is provided as a minus planetary gear set, the second planetary gear set RS2 is provided as a minus planetary gear set, and the first planetary gear set RS1 is provided as a minus planetary gear set.

In this gear set arrangement, it is provided that the transmission input shaft 1 is connected to the planet carrier 17 of the second front-mounted gear set VR2. The ring gear 18 of the second front-mounted gear set VR2 is fixable via the fourth brake B4, wherein the sun gear 16 of the second front-mounted gear set VR2 is connected to the planet carrier 14 of the first front-mounted gear set VR1 and is connectable via a fourth free-wheel clutch F4 to the ring gear 18 of the second front-mounted gear set VR2. The sun gear 13 of the first front-mounted gear set VR1 is fixable via the third brake B3 and is connectable via a third free-wheel clutch F3 to the planet carrier 14 of the first front-mounted gear set VR1, wherein the ring gear 15 of the first front-mounted gear set VR1 is connected to the planet carrier 8 of the second planetary gear set RS2 and is connectable via the second free-wheel clutch F2 to the ring gear 6 of the first planetary gear set RS1. The sun gear 7 of the second planetary gear set RS2 is connected to the planet carrier 5 of the first planetary gear set RS1, wherein the ring gear 9 of the second planetary gear set RS2 is connected to the transmission output shaft 2 and is connectable via the first free-wheel clutch F1 to the sun gear 4 of the first planetary gear set RS1, wherein the sun gear 4 of the first planetary gear set RS1 is fixable via the first brake B1. Moreover, the ring gear 6 of the first planetary gear set RS1 is fixable via the second brake B2.

The gear set arrangement according to FIG. 2 corresponds to the arrangement according to FIG. 1, although with another gear set sequence and without an electric machine EM.

Figure 3:
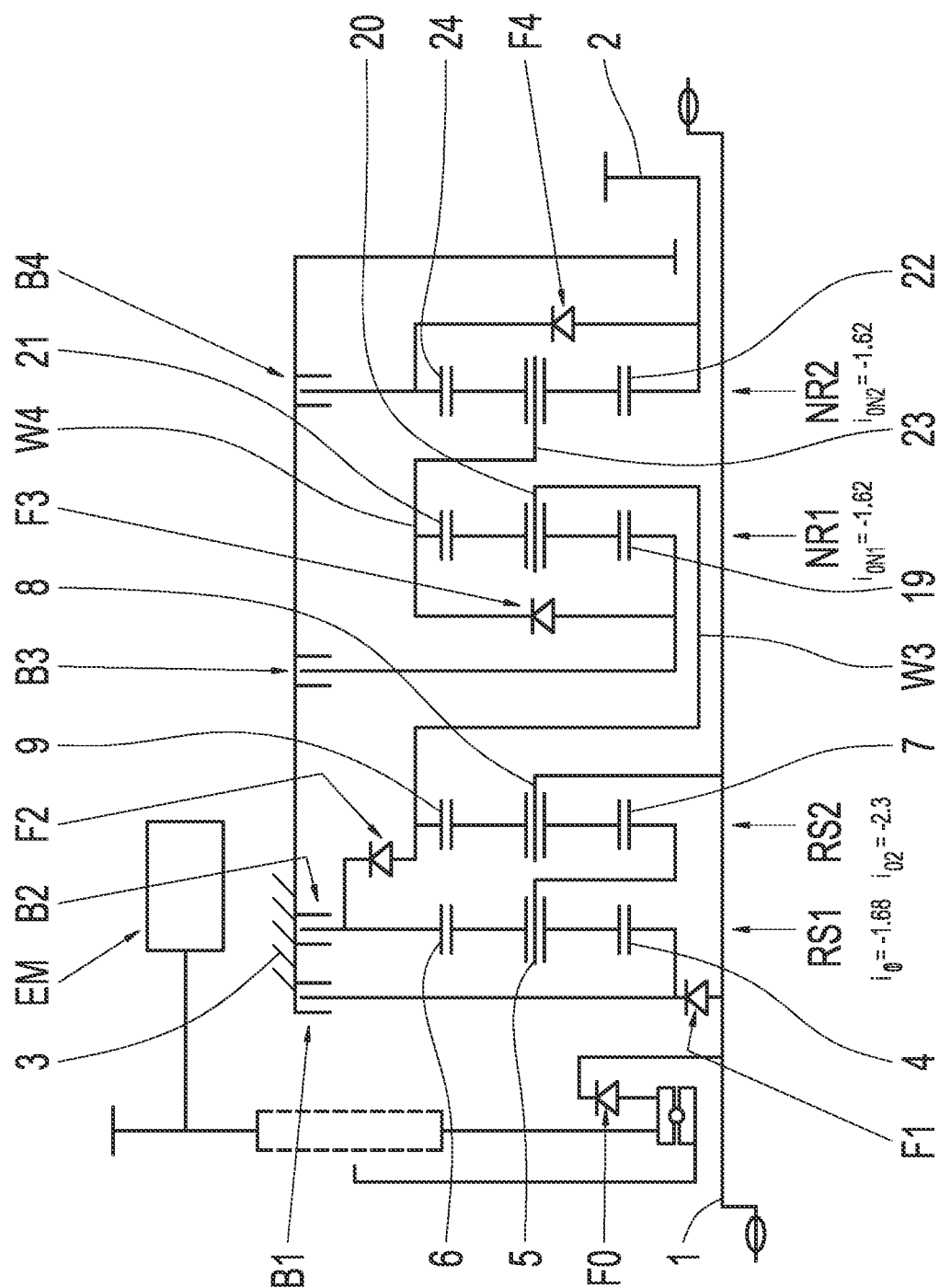
FIG. 3 shows a diagrammatic view of a third embodiment variant of the multi-stage transmission with two rear-mounted gear sets behind the main shift gear set, as a 16-speed variant.

In FIG. 3, a third example embodiment variant of the multi-stage transmission as a sixteen-speed (16-speed) variant is shown, in which, in axial sequence, the first planetary gear set RS1 is provided as a negative or minus planetary gear set, the second planetary gear set RS2 is provided as a minus planetary gear set, a first rear-mounted gear set NR1 is provided as a minus planetary gear set, and a second rear-mounted gear set NR2 is provided as a minus planetary gear set. Moreover, the stationary transmission ratio $i_{01}$ of the first planetary gear set RS1, the stationary transmission ratio $i_{02}$ of the second planetary gear set RS2, the stationary transmission ratio $i_{0N1}$ of the first rear-mounted gear set NR1, and the stationary transmission ratio $i_{0N2}$ of the second rear-mounted gear set NR2 are indicated in FIG. 3.

Specifically, it is provided in the third example embodiment variant that the transmission input shaft 1 is connected to the planet carrier 8 of the second planetary gear set RS2. The sun gear 7 of the second planetary gear set RS2 is connected to the planet carrier 5 of the first planetary gear set RS1, wherein the ring gear 9 of the second planetary gear set 2 is connected to the planet carrier 20 of the first rear-mounted gear set NR1 and is connectable via the second free-wheel clutch F2 to the ring gear 6 of the first planetary gear set RS1. The ring gear 6 of the first planetary gear set RS1 is fixable via the second brake B2, wherein the sun gear 4 of the first planetary gear set RS1 is fixable via the first brake B1 and is connectable via the first free-wheel clutch F1 to the transmission input shaft 1 and, as a result, to the planet carrier 8 of the second planetary gear set RS2. The sun gear 19 of the first rear-mounted gear set NR1 is fixable via the third brake B3 and is connectable via a third free-wheel clutch F3 to the ring gear 21 of the first rear-mounted gear set NR1, wherein the ring gear 21 of the first rear-mounted gear set NR1 is connected to the planet carrier 23 of the second rear-mounted gear set NR2. The sun gear 22 of the second rear-mounted gear set NR2 is connected to the transmission output shaft 2 and is connectable via a fourth free-wheel clutch F4 to the ring gear 24 of the second rear-mounted gear set NR2. The ring gear 24 of the second rear-mounted gear set NR2 is fixable via the fourth brake B4, wherein the transmission input shaft 1 is connectable, via a zeroth free-wheel clutch F0, to the electric machine EM.

The transmission diagram of the third example embodiment variant according to FIG. 3 offers an improved economy of space due to the single gear set sequence. In addition, the electric machine EM is couplable to the transmission input shaft 1 via a free-wheel clutch F0. This yields the advantage that, during the pedaling with the electric machine drive switched off, no drag torques are generated due to an electric machine EM driven by the pedaling.

In FIG. 4, a shift pattern is represented for the first, second, and third example embodiment variants according to FIGS. 1 through 3.

Figure 5:
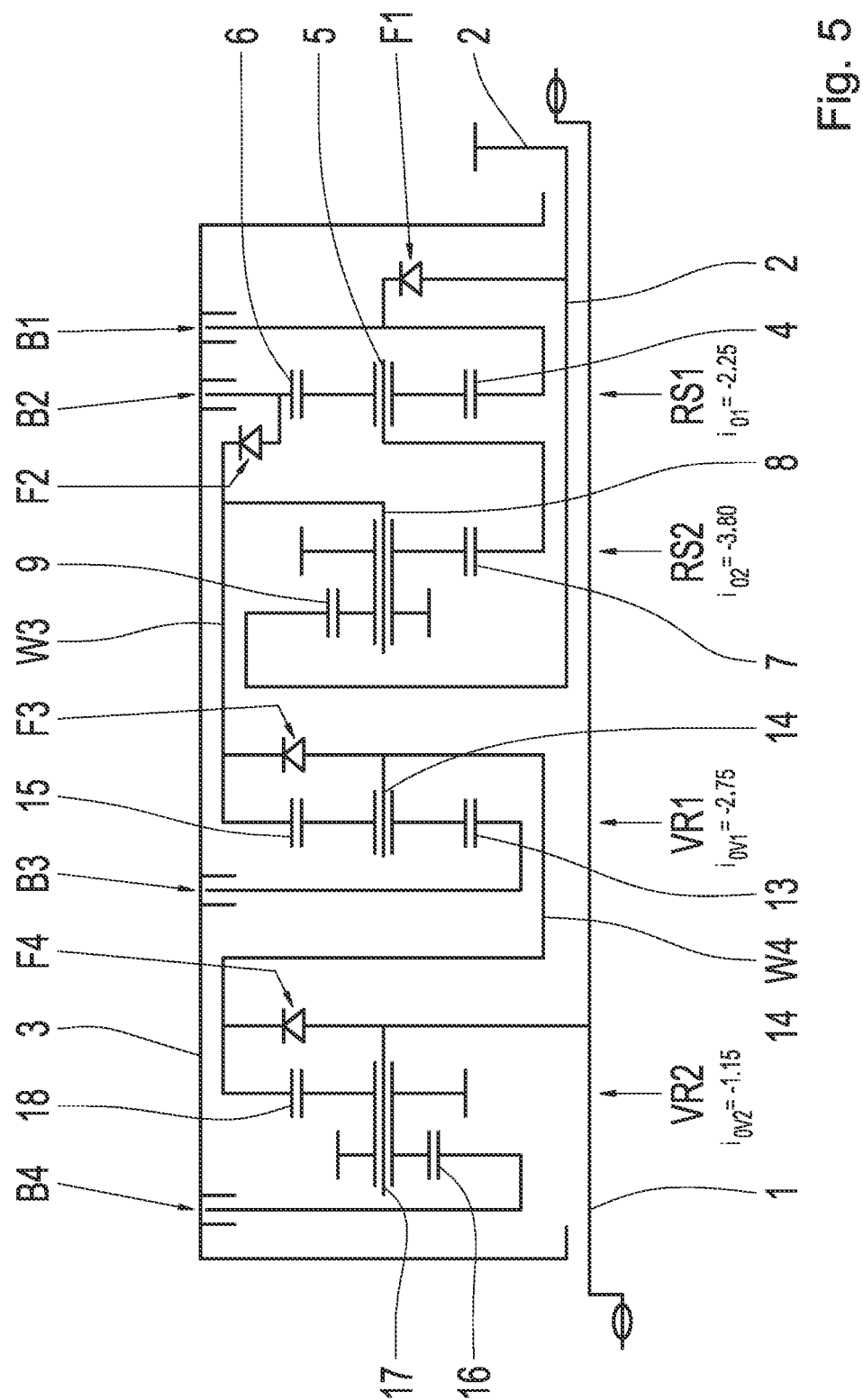
FIG. 5 shows a diagrammatic view of a fourth embodiment variant of the multi-stage transmission according to FIG. 2 with stepped planets at individual gear sets.

In FIG. 5, a fourth example embodiment variant of the multi-stage transmission as a sixteen-speed (16-speed) variant is shown, in which, in axial sequence, a second front-mounted gear set VR2 with a stepped planet is provided as a negative or minus planetary gear set, a first front-mounted gear set VR1 is provided as a minus planetary gear set, the second planetary gear set RS2 with a stepped planet is provided as a minus planetary gear set, and the first planetary gear set RS1 is provided as a minus planetary gear set. Moreover, the stationary transmission ratio $i_{0V2}$ of the second front-mounted gear set VR2, the stationary transmission ratio $i_{0V1}$ of the first front-mounted gear set VR1, the stationary transmission ratio $i_{02}$ of the second planetary gear set RS2, and the stationary transmission ratio $i_{01}$ of the first planetary gear set RS1 are indicated in FIG. 5.

Specifically, it is provided in the fourth example embodiment variant that the transmission input shaft 1 is connected to the planet carrier 17 of the second front-mounted gear set VR2 and is connectable via a fourth free-wheel clutch F4 to the ring gear 18 of the second front-mounted gear set VR2. The sun gear 16 of the second front-mounted gear set VR2 is fixable via the fourth brake B4, wherein the ring gear 18 of the second front-mounted gear set VR2 is connected to the planet carrier 14 of the first front-mounted gear set VR1 and is connectable via a third free-wheel clutch F3 to the ring gear 15 of the first front-mounted gear set VR1. The sun gear 13 of the first front-mounted gear set VR1 is fixable via the third brake B3, wherein the ring gear 15 of the first front-mounted gear set VR1 is connected to the planet carrier 8 of the second planetary gear set RS2 and is connectable via the second free-wheel clutch F2 to the ring gear 6 of the first planetary gear set RS1. The ring gear 9 of the second planetary gear set RS2 is connected to the transmission output shaft 2 and is connectable via the first free-wheel clutch F1 to the sun gear 4 of the first planetary gear set RS1, wherein the sun gear 7 of the second planetary gear set RS2 is connected to the planet carrier 5 of the first planetary gear set RS1. The ring gear 6 of the first planetary gear set RS1 is fixable via the second brake B2, wherein the sun gear 4 of the first planetary gear set RS1 is fixable via the first brake B1.

The transmission diagram of the fourth example embodiment variant, with the single gear set sequence, allows for a smaller overall gear ratio, preferably for road bicycles. For the purpose of better economy of space and for an even lower or higher absolute stationary transmission ratio, in the fourth example embodiment variant, the second front-mounted gear set VR2 and the second planetary gear set RS2 are equipped with a stepped planet.

Figure 6:
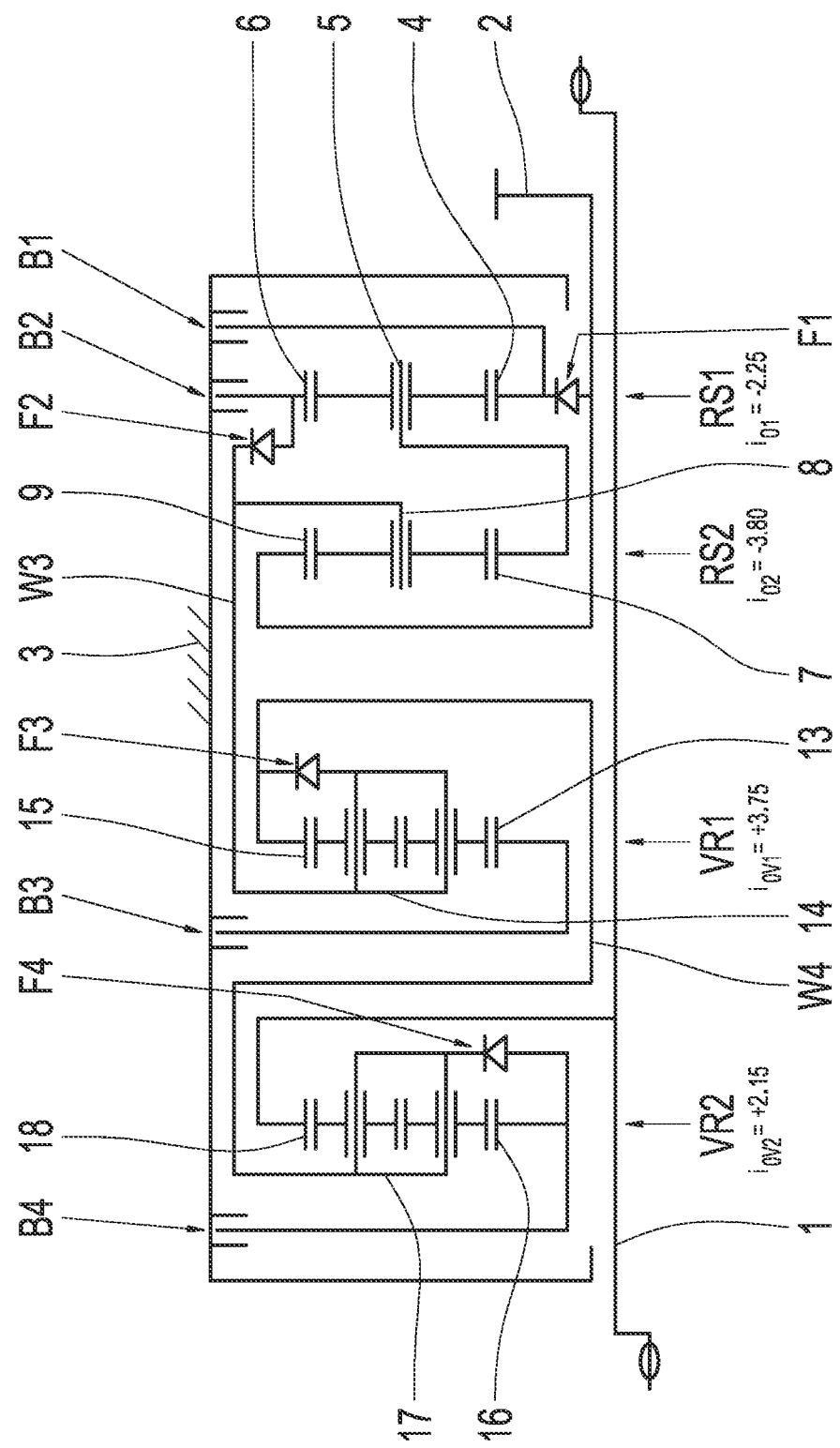
FIG. 6 shows a diagrammatic view of a fifth embodiment variant according to FIG. 5 with front-mounted gear sets designed as a plus gear set.

In FIG. 6, a fifth example embodiment variant of the multi-stage transmission as a sixteen-speed (16-speed) variant is shown, in which, in axial sequence, a second front-mounted gear set VR2 is provided as a positive or plus planetary gear set, a first front-mounted gear set VR1 is provided as a plus planetary gear set, the second planetary gear set RS2 is provided as a negative or minus planetary gear set, and the first planetary gear set RS1 is provided as a minus planetary gear set. Moreover, the stationary transmission ratio $i_{0V2}$ of the second front-mounted gear set VR2, the stationary transmission ratio $i_{0V1}$ of the first front-mounted gear set VR1, the stationary transmission ratio $i_{02}$ of the second planetary gear set RS2, and the stationary transmission ratio $i_{01}$ of the first planetary gear set RS1 are indicated in FIG. 6.

Specifically, in the case of the fifth example embodiment variant, the transmission input shaft 1 is connected to the ring gear 18 of the second front-mounted gear set VR2. The sun gear 16 of the second front-mounted gear set VR2 is fixable via the fourth brake B4 and is connectable via a fourth free-wheel clutch F4 to the planet carrier 17 of the second front-mounted gear set VR2, wherein the planet carrier 17 of the second front-mounted gear set VR2 is connected to the ring gear 15 of the first front-mounted gear set VR1. The ring gear 15 of the first front-mounted gear set VR1 is connectable via a third free-wheel clutch F3 to the planet carrier 14 of the first front-mounted gear set VR1, wherein the sun gear 13 of the first front-mounted gear set VR1 is fixable via the third brake B3. The planet carrier 14 of the first front-mounted gear set VR1 is connected to the planet carrier 8 of the second planetary gear set RS2 and is connectable via the second free-wheel clutch F2 to the ring gear 6 of the first planetary gear set RS1, wherein the ring gear 9 of the second planetary gear set RS2 is connected to the transmission output shaft 2 and is connectable via the first free-wheel clutch F1 to the sun gear 4 of the first planetary gear set RS1. The ring gear 6 of the first planetary gear set RS1 is fixable via the second brake B2, wherein the sun gear 4 of the first planetary gear set RS1 is fixable via the first brake B1, wherein the sun gear 7 of the second planetary gear set RS2 is connected to the planet carrier 5 of the first planetary gear set RS1.

The transmission diagram of the fifth example embodiment variant, due to the front-mounted gear sets VR1 and VR2 designed as plus gear sets, allows for a non-stepped design as well as a stationary transmission ratio between the second front-mounted gear set VR2 and the second planetary gear set RS2 as well as between the first front-mounted gear set VR1 and the first planetary gear set RS1 that has been equalized in terms of absolute value. Consequently, identical sun gears and ring gears can be utilized in each case.

In FIG. 7, a shift pattern is represented for the fourth and fifth example embodiment variants according to FIGS. 5 and 6.

On the basis of the shift patterns according to FIGS. 4 and 7, it is apparent with respect to the above-described example embodiment variants that, in order to shift a first gear G1, the first, the second, the third, and the fourth brakes B1, B2, B3, B4 are disengaged, wherein the first, the second, the third, and the fourth free-wheel clutches F1, F2, F3, F4 are in the locking direction condition. In order to shift a second gear G2, the first brake B1 is engaged and the second, the third, and the fourth brakes B2, B3, B4 are disengaged, wherein the first free-wheel clutch F1 is in the overrun operation condition and the second, the third, and the fourth free-wheel clutches F2, F3, F4 are in the locking direction condition. In order to shift a second gear G3, the second brake B2 is engaged and the first, the third, and the fourth brakes B1, B3, B4 are disengaged, wherein the second free-wheel clutch F2 is in the overrun operation condition and the first, the third, and the fourth free-wheel clutches F1, F3, F4 are in the locking direction condition. In order to shift a fourth gear G4, the first and the second brakes B1, B2 are engaged and the third and the fourth brakes B3, B4 are disengaged, wherein the first and the second free-wheel clutches F1, F2 are in the overrun operation condition and the third and the fourth free-wheel clutches F3, F4 are in the locking direction condition. In order to shift a fifth gear G5, the third brake B3 is engaged and the first, the second, and the fourth brakes B1, B2, B4 are disengaged, wherein the first, the second, and the fourth free-wheel clutches F1, F2, F4 are in the locking direction condition and the third free-wheel clutch F3 is in the overrun operation condition. In order to shift a sixth gear G6, the first and the third brakes B1, B3 are engaged and the second and the fourth brakes B2, B4 are disengaged, wherein the first and the third free-wheel clutches F1, F3 are in the overrun operation condition and the second and the fourth free-wheel clutches F2, F4 are in the locking direction condition. In order to shift a seventh gear G7, the first and the fourth brakes B1, B4 are disengaged and the second and the third brakes B2, B3 are engaged, wherein the first and the fourth free-wheel clutches F1, F4 are in the locking direction condition and the second and the third free-wheel clutches F2, F3 are in the overrun operation condition. In order to shift an eighth gear G8, the first, the second, and the third brakes B1, B2, B3 are engaged and the fourth brake B4 is disengaged, wherein the first, the second, and the third free-wheel clutches F1, F2, F3 are in the overrun operation condition and the fourth free-wheel clutch F4 is in the locking direction condition. In order to shift a ninth gear G9, the first, the second, and the third brakes B1, B2, B3 are disengaged and the fourth brake B4 is engaged, wherein the first, the second, and the third free-wheel clutches F1, F2, F3 are in the locking direction condition and the fourth free-wheel clutch F4 is in the overrun operation condition. In order to shift a tenth gear G10, the first and the fourth brakes B1, B4 are engaged and the second and the third brakes B2, B3 are disengaged, wherein the first and the fourth free-wheel clutches F1, F4 are in the overrun operation condition and the second and the third free-wheel clutches F2, F3 are in the locking direction condition. In order to shift an eleventh gear G11, the first and the third brakes B1, B3 are disengaged and the second and the fourth brakes B2, B4 are engaged, wherein the first and the third free-wheel clutches F1, F3 are in the locking direction condition and the second and the fourth free-wheel clutches F2, F4 are in the overrun operation condition. In order to shift a twelfth gear G12, the first, the second, and the fourth brakes B1, B2, B4 are engaged and the third brake B3 is disengaged, wherein the first, the second, and the fourth free-wheel clutches F1, F2, F4 are in the overrun operation condition and the third free-wheel clutch F3 is in the locking direction condition. In order to shift a thirteenth gear G13, the first and the second brakes B1, B2 are disengaged and the third and the fourth brakes B3, B4 are engaged, wherein the first and the second free-wheel clutches F1, F2 are in the locking direction condition and the third and the fourth free-wheel clutches F3, F4 are in the overrun operation condition. In order to shift a fourteenth gear G14, the first, the third, and the fourth brakes B1, B3, B4 are engaged and the second brake B2 is disengaged, wherein the first, the third, and the fourth free-wheel clutches F4 are in the overrun operation condition and the second free-wheel clutch F2 is in the locking direction condition. In order to shift a fifteenth gear G15, the first brake B1 is disengaged and the second, the third, and the fourth brakes B2, B3, B4 are engaged, wherein the first free-wheel clutch F1 is in the locking direction condition and the second, the third, and the fourth free-wheel clutches F2, F3, F4 are in the overrun operation condition. In order to shift a sixteenth gear G16, the first, the second, the third, and the fourth brakes B1, B2, B3, B4 are engaged, wherein the first, the second, the third, and the fourth free-wheel clutches F1, F2, F3, F4 are in the overrun operation condition.

Figure 8:
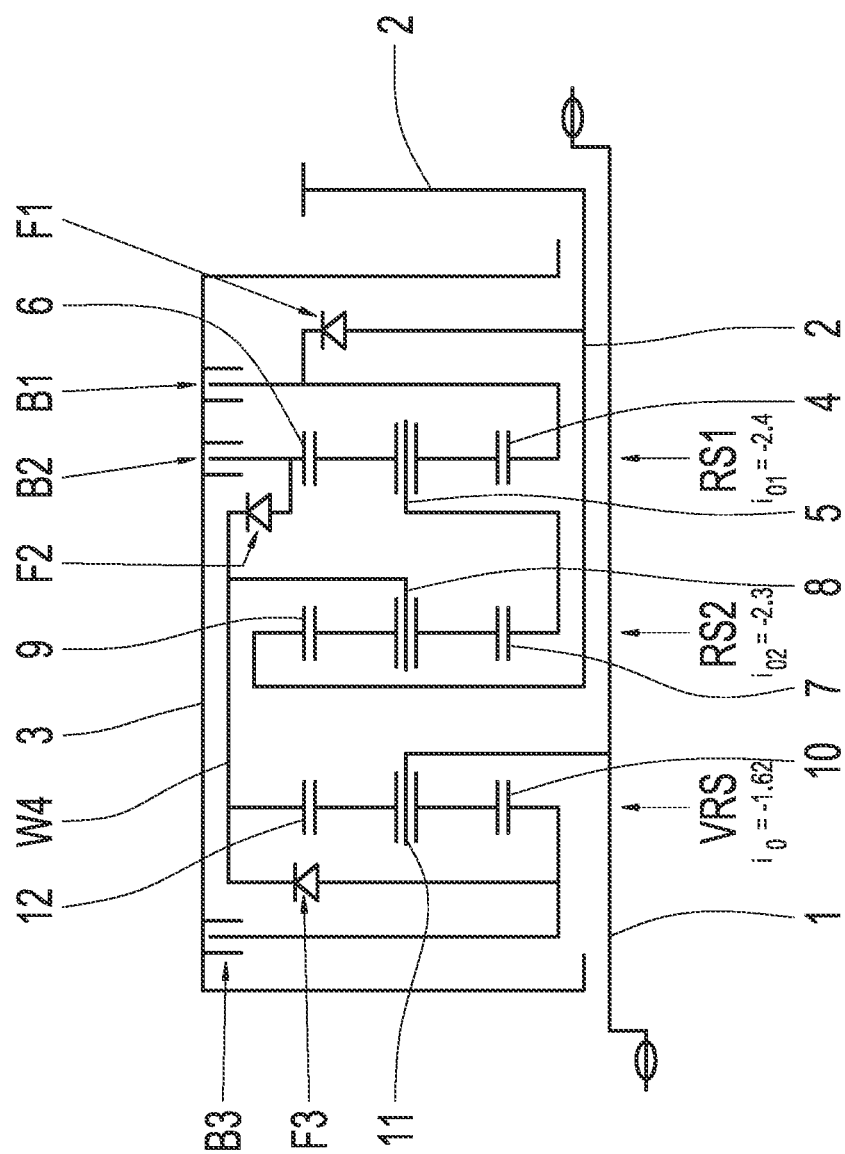
FIG. 8 shows a sixth embodiment variant of the multi-stage transmission with a front-mounted gear set ahead of the main shift gear set, as an 8-speed variant.

In FIG. 8, a sixth example embodiment variant of the multi-stage transmission as an eight-speed (8-speed) variant is shown, in which, in axial sequence, the front-mounted gear set VRS is provided as a negative or minus planetary gear set, the second planetary gear set RS2 is provided as a minus planetary gear set, and the first planetary gear set RS1 is provided as a minus planetary gear set. Moreover, the stationary transmission ratio $i_{0V}$ of the front-mounted gear set VRS, the stationary transmission ratio $i_{02}$ of the second planetary gear set RS2, and the stationary transmission ratio $i_{01}$ of the first planetary gear set RS1 are indicated in FIG. 8.

In detail, it is provided in the sixth example embodiment variant that the transmission input shaft 1 is connected to the planet carrier 11 of the front-mounted gear set VRS, wherein the sun gear 10 of the front-mounted gear set VRS is fixable via the third brake B3 and is connectable via a third free-wheel clutch F3 to the ring gear 12 of the front-mounted gear set VRS. The ring gear 12 of the front-mounted gear set VRS is connected to the planet carrier 8 of the second planetary gear set RS2 and is connectable via the second free-wheel clutch F2 to the ring gear 6 of the first planetary gear set RS1, wherein the ring gear 9 of the second planetary gear set RS2 is connected to the transmission output shaft 2 and is connectable via the first free-wheel clutch F1 of the first planetary gear set RS1 to the sun gear 4 of the first planetary gear set RS1. The sun gear 7 of the second planetary gear set RS2 is connected to the planet carrier 5 of the first planetary gear set RS1, wherein the ring gear 6 of the first planetary gear set RS1 is fixable via the second brake B2, and wherein the sun gear 4 of the first planetary gear set RS1 is fixable via the first brake B1.

In FIG. 9, a shift pattern is represented for the sixth example embodiment variant according to FIG. 8. As is apparent from the shift pattern, in order to shift a first gear G1, the first, the second, and the third brakes B1, B2, B3 are disengaged, wherein the first, the second, and the third free-wheel clutches F1, F2 F3 are in the locking direction condition. In order to shift a second gear G2, the first brake B1 is engaged and the second and the third brakes B2, B3 are disengaged, wherein the first free-wheel clutch F1 is in the overrun operation condition and the second and the third free-wheel clutches F2, F3 are in the locking direction condition. In order to shift a third gear G3, the second brake B2 is engaged and the first and the third brakes B1, B3 are disengaged, wherein the second free-wheel clutch F2 is in the overrun operation condition and the first and the third free-wheel clutches F1, F3 are in the locking direction condition. In order to shift a fourth gear G4, the first and the second brakes B1, B2 are engaged and the third brake B3 is disengaged, wherein the first and the second free-wheel clutches F1, F2 are in the overrun operation condition and the third free-wheel clutch F3 is in the locking direction condition. In order to shift a fifth gear G5, the third brake B3 is engaged and the first and the second brakes B1, B2 are disengaged, wherein the first and the second free-wheel clutches F1, F2 are in the locking direction condition and the third free-wheel clutch F3 is in the overrun operation condition. In order to shift a sixth gear G6, the first and the third brakes B1, B3 are engaged and the second brake B2 is disengaged, wherein the first and the third free-wheel clutches F1, F3 are in the overrun operation condition and the second free-wheel clutch F2 is in the locking direction condition. In order to shift a seventh gear G7, the first brake B1 is disengaged and the second and the third brakes B2, B3 are engaged, wherein the first free-wheel clutch F1 is in the locking direction condition and the second and the third free-wheel clutches F2, F3 are in the overrun operation condition. In order to shift an eighth gear G8, the first, the second, and third brakes B1, B2, B3 are engaged, wherein the first, the second, and the third free-wheel clutches F1, F2, F3 are in the overrun operation condition.

Figure 10:
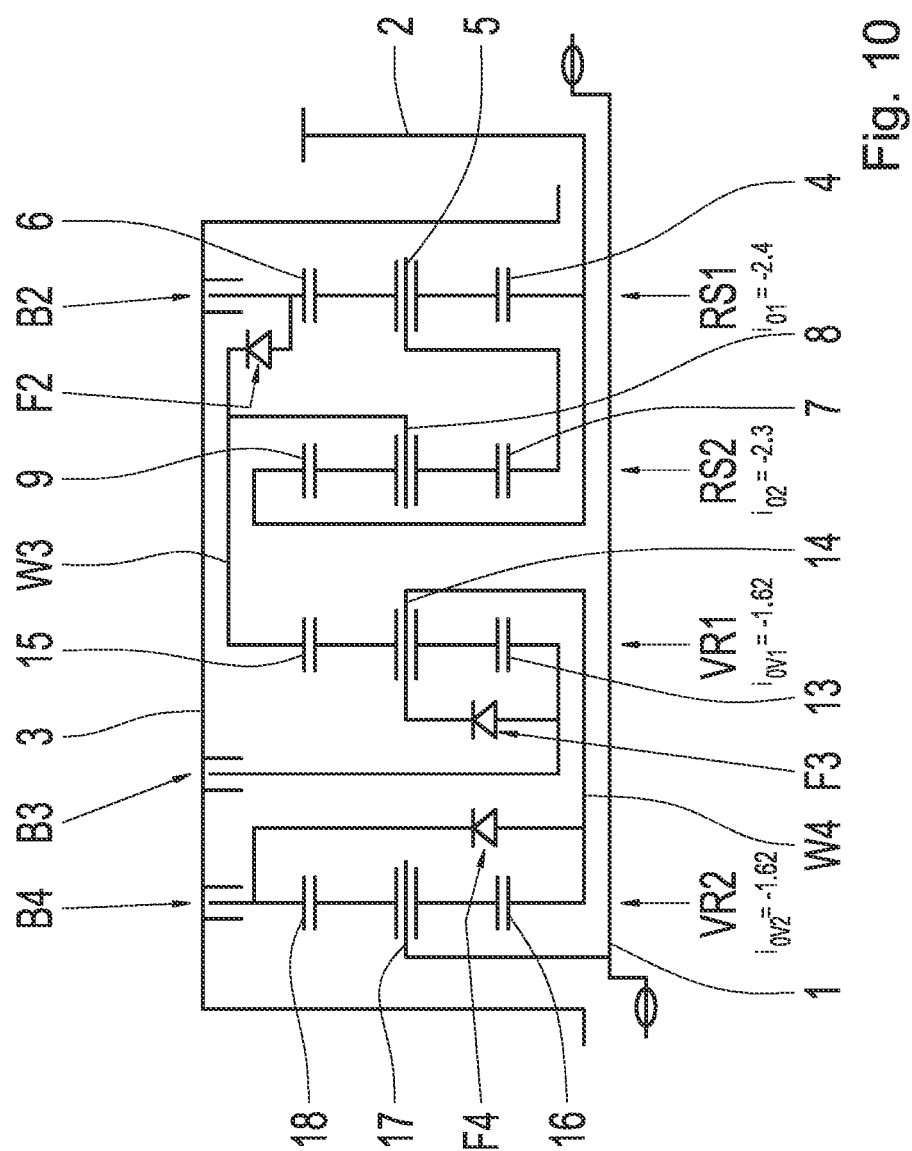
FIG. 10 shows a seventh embodiment variant of the multi-stage transmission with two front-mounted gear sets ahead of the main shift gear set, as an 8-speed variant.

In FIG. 10, a seventh example embodiment variant of the multi-stage transmission as an eight-speed (8-speed) variant is shown, in which, in axial sequence, the second front-mounted gear set VR2 is provided as a negative or minus planetary gear set, the first front-mounted gear set VR1 is provided as a minus planetary gear set, the second planetary gear set RS2 is provided as a minus planetary gear set, and the first planetary gear set RS1 is provided as a minus planetary gear set. Moreover, the stationary transmission ratio $i_{0V2}$ of the second front-mounted gear set VR2, the stationary transmission ratio $i_{0V1}$ of the first front-mounted gear set VR1, the stationary transmission ratio $i_{02}$ of the second planetary gear set RS2, and the stationary transmission ratio $i_{01}$ of the first planetary gear set RS1 are indicated in FIG. 10.

Specifically, it is provided in the seventh example embodiment variant that the transmission input shaft 1 is connected to the planet carrier 17 of the second front-mounted gear set VR2. The sun gear 16 of the second front-mounted gear set VR2 is connected to the planet carrier 14 of the first front-mounted gear set VR1 and is connectable via a fourth free-wheel clutch F4 to the ring gear 18 of the second front-mounted gear set VR2, wherein the ring gear 18 of the second front-mounted gear set VR2 is fixable via the fourth brake B4. The sun gear 13 of the first front-mounted gear set VR1 is fixable via the third brake B3 and is connectable via a third free-wheel clutch F3 to the planet carrier 14 of the first front-mounted gear set VR1. The ring gear 15 of the first front-mounted gear set VR1 is connected to the planet carrier 8 of the second planetary gear set RS2 and is connectable via the second free-wheel clutch F2 to the ring gear 6 of the first planetary gear set RS1. The ring gear 9 of the second planetary gear set RS2 is connected to the transmission output shaft 2 and to the sun gear 4 of the first planetary gear set RS1, wherein the sun gear 7 of the second planetary gear set RS2 is connected to the planet carrier 5 of the first planetary gear set RS1 and wherein the ring gear 6 of the first planetary gear set RS1 is fixable via the second brake B2.

In FIG. 11, a shift pattern is represented for the seventh example embodiment variant according to FIG. 10. As is apparent from the shift pattern, in order to shift a first gear G1, the second, the third, and the fourth brakes B2, B3, B4 are disengaged, wherein the second, the third, and the fourth free-wheel clutches F2, F3, F4 are in the locking direction condition. In order to shift a second gear G2, the second brake B2 is engaged and the third and the fourth brakes B3, B4 are disengaged, wherein the second free-wheel clutch F2 is in the overrun operation condition and the third and the fourth free-wheel clutches F3, F4 are in the locking direction condition. In order to shift a third gear G3, the third brake B3 is engaged and the second and the fourth brakes B2, B4 are disengaged, wherein the third free-wheel clutch F3 is in the overrun operation condition and the second and the fourth free-wheel clutches F2, F4 are in the locking direction condition. In order to shift a fourth gear G4, the second and the third brakes B2, B3 are engaged and the fourth brake B4 is disengaged, wherein the second and the third free-wheel clutches F2, F3 are in the overrun operation condition and the fourth free-wheel clutch F4 is in the locking direction condition. In order to shift a fifth gear G5, the fourth brake B4 is engaged and the second and the third brakes B2, B3 are disengaged, wherein the second and the third free-wheel clutches F2, F3 are in the locking direction condition and the fourth free-wheel clutch F4 is in the overrun operation condition. In order to shift a sixth gear G6, the second and the fourth brakes B2, B4 are engaged and the third brake B3 is disengaged, wherein the second and the fourth free-wheel clutches F2, F4 are in the overrun operation condition and the third free-wheel clutch F3 is in the locking direction condition. In order to shift a seventh gear G7, the second brake B2 is disengaged and the third and the fourth brakes B3, B4 are engaged, wherein the second free-wheel clutch F2 is in the locking direction condition and the third and the fourth free-wheel clutches F3, F4 are in the overrun operation condition. In order to shift an eighth gear G8, the second, the third, and the fourth brakes B2, B3, B4 are engaged, wherein the second, the third, and the fourth free-wheel clutches F2, F3, F4 are in the overrun operation condition.

In the transmission diagrams according to the sixth and seventh example embodiment variants according to FIGS. 8 and 10, starting from the preceding example embodiment variants, 8-speed variants have been implemented, which have ratio steps and/or an overall gear ratio in the magnitude of the 16-speed variants, wherein the single gear sets and their stationary transmission ratios remain roughly unchanged. In contrast to the 16-speed variants, one free-wheel clutch F1 and F4, respectively, and one brake, such as B1 and B4, respectively, as well as one gear set are omitted, whereby a reduction of the installation length and the costs results.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 transmission input shaft and/or pedal crankshaft
2 transmission output shaft
3 housing
4 sun gear of the first planetary gear set
5 planet carrier and/or carrier of the first planetary gear set
6 ring gear of the first planetary gear set
7 sun gear of the second planetary gear set
8 planet carrier of the second planetary gear set
9 ring gear of the second planetary gear set
10 sun gear of the front-mounted gear set
11 planet carrier of the front-mounted gear set
12 ring gear of the front-mounted gear set
13 sun gear of the first front-mounted gear set
14 planet carrier of the first front-mounted gear set
15 ring gear of the first front-mounted gear set
16 sun gear of the second front-mounted gear set
17 planet carrier of the second front-mounted gear set
18 ring gear of the second front-mounted gear set
19 sun gear of the first rear-mounted gear set
20 planet carrier of the first rear-mounted gear set
21 ring gear of the first rear-mounted gear set
22 sun gear of the second rear-mounted gear set
23 planet carrier of the second rear-mounted gear set
24 ring gear of the second rear-mounted gear set
25 sun gear of the rear-mounted gear set
26 planet carrier of the rear-mounted gear set
27 ring gear of the rear-mounted gear set
RS1 first planetary gear set
RS2 second planetary gear set
VRS front-mounted gear set
VR1 first front-mounted gear set
VR2 second front-mounted gear set
NRS rear-mounted gear set
NR1 first rear-mounted gear set
NR2 second rear-mounted gear set
B1 first brake
B2 second brake
B3 third brake
B4 fourth brake
EM electric machine
F0 zeroth free-wheel clutch
F1 first free-wheel clutch
F2 second free-wheel clutch
F3 third free-wheel clutch
F4 fourth free-wheel clutch
G1 first gear
G2 second gear
G3 third gear
G4 fourth gear
G5 fifth gear
G6 sixth gear
G7 seventh gear
G8 eighth gear
G9 ninth gear
G10 tenth gear
G11 eleventh gear
G12 twelfth gear
G13 thirteenth gear
G14 fourteenth gear
G15 fifteenth gear
G16 sixteenth gear
$i_{0V}$ stationary transmission ratio of the front-mounted gear set
$i_{0V1}$ stationary transmission ratio of the first front-mounted gear set
$i_{0V2}$ stationary transmission ratio of the second front-mounted gear set
$i_{01}$ stationary transmission ratio of the first planetary gear set
$i_{02}$ stationary transmission ratio of the second planetary gear set
$i_{0N}$ stationary transmission ratio of the rear-mounted gear set
$i_{0N1}$ stationary transmission ratio of the first rear-mounted gear set
$i_{0N2}$ stationary transmission ratio of the second rear-mounted gear set
i ratio
φ stepping
$φ_{ges}$ overall gear ratio
W3 intermediate shaft
W4 intermediate shaft

The invention claimed is:

1. A planetary multi-stage transmission for a bicycle or a pedelec, comprising:
   a transmission input shaft (1);
   a transmission output shaft (2);
   at least three planetary gear sets (VRS, VR1, VR2, RS1, RS2, NRS, NR1, NR2); and
   at least three free-wheel clutches (F1, F2, F3, F4) and at least three brakes (B1, B2, B3, B4) configured for implementing at least eight gears (G1, G2, G3, G4, G5, G6, G7, G8, G9, G10, G11, G12, G13, G14, G15, G16),
   wherein a first planetary gear set (RS1) and a second planetary gear set (RS2) of the at least three planetary gear sets (VRS, VR1, VR2, RS1, RS2, NRS, NR1, NR2) are configured as a main shift gear set and at least one further planetary gear set (VRS, VR1, VR2, NRS, NR1, NR2) of the at least three planetary gear sets (VRS, VR1, VR2, RS1, RS2, NRS, NR1, NR2) is configured as a front-mounted gear set and/or as a rear-mounted gear set, wherein a planet carrier (5) of the first planetary gear set (RS1) is connected to a sun gear (7) of the second planetary gear set (RS2), wherein a ring gear (6) of the first planetary gear set (RS1) is fixable via a second brake (B2) of the at least three brakes (B1, B2, B3, B4) and is connectable to a planet carrier (8) of the second planetary gear set (RS2) or to a ring gear (9) of the second planetary gear set (RS2) via a second free-wheel clutch (F2) of the at least three free-wheel clutches (F1, F2, F3, F4), wherein the planet carrier (8) of the second planetary gear set (RS2) is connected to the transmission input shaft (1) or to a gear set element as an output of the front-mounted gear set (VR1, VRS), wherein the ring gear (9) of the second planetary gear set (RS2) is connected to the transmission output shaft (2) or to a gear set element as an input of the rear-mounted gear set (NRS, NR1), and wherein either a sun gear (4) of the first planetary gear set (RS1) is fixable via a first brake (B1) of the at least three brakes (B1, B2, B3, B4) and is connectable to the planet carrier (8) of the second planetary gear set (RS2) or to the ring gear (9) of the second planetary gear set (RS2) via a first free-wheel clutch (F1) of the at least three free-wheel clutches (F1, F2, F3, F4), or the sun gear (4) of the first planetary gear set (RS1) is connected to the planet carrier (8) of the second planetary gear set (RS2) or to the ring gear (9) of the second planetary gear set (RS2).

2. The multi-stage transmission of claim 1, wherein:
one or more of the front-mounted gear sets (VRS, VR1, VR2) and the rear-mounted gear sets (NRS, NR1, NR2) is configured as a minus gear set;
a first gear set element of each minus gear set is configured as an input and is a planet carrier (11, 14, 17, 20, 23, 26);
a second gear set element of each minus gear set is configured as an output and is one of a sun gear (10, 13, 16, 19, 22, 25) and a ring gear (12, 15, 18, 21, 24, 27); and
a third gear set element of each minus gear set is fixable via a third brake (B3) or a fourth brake (B4) of the at least three brakes (B1, B2, B3, B4) and is the other of the ring gear (12, 15, 18, 21, 24, 27) and the sun gear (10, 13, 16, 19, 22, 25).

3. The multi-stage transmission of claim 1, wherein:
one or more of the front-mounted gear sets (VRS, VR1, VR2) and the rear-mounted gear sets (NRS, NR1, NR2) is configured as a plus gear set;
a first gear set element of each plus gear set is configured as an input and is ring gear (12, 15, 18, 21, 24, 27);
a second gear set element of each plus gear set is configured as an output and is one of a sun gear (10, 13, 16, 19, 22, 25) and a planet carrier (11, 14, 17, 20, 23, 26); and
a third gear set element of each plus gear set is fixable via a third brake (B3) or a fourth brake (B4) of the at least three brakes (B1, B2, B3, B4) and is the other of the sun gear (10, 13, 16, 19, 22, 25) and the planet carrier (11, 14, 17, 20, 23, 26).

4. The multi-stage transmission of claim 1, wherein each of the at least three brakes (B1, B2, B3, B4) is a respective free-wheel brake.

5. The multi-stage transmission of claim 1, further comprising at least one electric machine (EM) operable to drive rotation of the transmission output shaft (2).

6. The multi-stage transmission of claim 5, wherein the transmission input shaft (1) is connectable via a zeroth free-wheel clutch (F0) to the electric machine (EM).

7. The multi-stage transmission of claim 1, wherein:
the at least three planetary gear sets (VRS, VR1, VR2, RS1, RS2, NRS, NR1, NR2) are arranged in an axial sequence of the front-mounted gear set (VRS), the second planetary gear set (RS2), the first planetary gear set (RS1), and the rear-mounted gear set (NRS); and
each of the front-mounted gear set (VRS), the second planetary gear set (RS2), the first planetary gear set (RS1), and the rear-mounted gear set (NRS) is configured as a respective minus planetary gear set.

8. The multi-stage transmission of claim 7, wherein:
the transmission input shaft (1) is connected to a planet carrier (11) of the front-mounted gear set (VRS);
a sun gear (10) of the front-mounted gear set (VRS) is fixable via a third brake (B3) of the at least three brakes (B1, B2, B3, B4), is connectable to a ring gear (12) of the front-mounted gear set (VRS) as well as to the planet carrier (8) of the second planetary gear set (RS2) via a third free-wheel clutch (F3) of the at least three free-wheel clutches (F1, F2, F3, F4), and is connectable to the ring gear (6) of the first planetary gear set (RS1) via the second free-wheel clutch (F2);
the ring gear (9) of the second planetary gear set (RS2) is connected to a planet carrier (26) of the rear-mounted gear set (NRS) and is connectable to the sun gear (4) of the first planetary gear set (RS1) via the first free-wheel clutch (F1);
the sun gear (7) of the second planetary gear set (RS2) is connected to the planet carrier (5) of the first planetary gear set (RS1);
a ring gear (27) of the rear-mounted gear set (NRS) is fixable via a fourth brake (B4) of the at least three brakes (B1, B2, B3, B4) and is connectable to the transmission output shaft (2) via a fourth free-wheel clutch (F4) of the at least three free-wheel clutches (F1, F2, F3, F4); and
a sun gear (25) of the rear-mounted gear set (NRS) is connected to the transmission output shaft (2).

9. The multi-stage transmission of claim 1, wherein:
the at least three planetary gear sets (VRS, VR1, VR2, RS1, RS2, NRS, NR1, NR2) are arranged in an axial sequence of a second front-mounted gear set (VR2), a first front-mounted gear set (VR1), the second planetary gear set (RS2), and the first planetary gear set (RS1); and
each of the second front-mounted gear set (VR2), the first front-mounted gear set (VR1), the second planetary gear set (RS2), and the first planetary gear set (RS1) is configured as a respective minus planetary gear set.

10. The multi-stage transmission of claim 9, wherein:
the transmission input shaft (1) is connected to a planet carrier (17) of the second front-mounted gear set (VR2);
a ring gear (18) of the second front-mounted gear set (VR2) is fixable via a fourth brake (B4) of the at least three brakes (B1, B2, B3, B4);
a sun gear (16) of the second front-mounted gear set (VR2) is connected to a planet carrier (14) of the first front-mounted gear set (VR1) and is connectable to the ring gear (18) of the second front-mounted gear set (VR2) via a fourth free-wheel clutch (F4) of the at least three free-wheel clutches (F1, F2, F3, F4);
a sun gear (13) of the first front-mounted gear set (VR1) is fixable via a third brake (B3) of the at least three brakes (B1, B2, B3, B4) and is connectable to the planet carrier (14) of the first front-mounted gear set (VR1) via a third free-wheel clutch (F3) of the at least three free-wheel clutches (F1, F2, F3, F4);

a ring gear (15) of the first front-mounted gear set (VR1) is connected to the planet carrier (8) of the second planetary gear set (RS2) and is connectable to the ring gear (6) of the first planetary gear set (RS1) via the second free-wheel clutch (F2);

the sun gear (7) of the second planetary gear set (RS2) is connected to the planet carrier (5) of the first planetary gear set (RS1); and the ring gear (9) of the second planetary gear set (RS2) is connected to the transmission output shaft (2) and is connectable to the sun gear (4) of the first planetary gear set (RS1) via the first free-wheel clutch (F1).

11. The multi-stage transmission of claim 1, wherein:
the at least three planetary gear sets (VRS, VR1, VR2, RS1, RS2, NRS, NR1, NR2) are arranged in an axial sequence of the first planetary gear set (RS1), the second planetary gear set (RS2), a first rear-mounted gear set (NR1), and a second rear-mounted gear set (NR2); and each of the first planetary gear set (RS1), the second planetary gear set (RS2), the first rear-mounted gear set (NR1), and the second rear-mounted gear set (NR2) is configured as a respective minus planetary gear set.

12. The multi-stage transmission of claim 11, wherein:
the transmission input shaft (1) is connected to the planet carrier (8) of the second planetary gear set (RS2);

the sun gear (7) of the second planetary gear set (RS2) is connected to the planet carrier (5) of the first planetary gear set (RS1);

the ring gear (9) of the second planetary gear set (RS2) is connected to a planet carrier (20) of the first rear-mounted gear set (NR1) and is connectable to the ring gear (6) of the first planetary gear set (RS1) via the second free-wheel clutch (F2);

the ring gear (6) of the first planetary gear set (RS1) is fixable via the second brake (B2);

the sun gear (4) of the first planetary gear set (RS1) is fixable via the first brake (B1) and is connectable to the transmission input shaft (1) via the first free-wheel clutch (F1);

a sun gear (19) of the first rear-mounted gear set (NR1) is fixable via a third brake (B3) of the at least three brakes (B1, B2, B3, B4) and is connectable to a ring gear (21) of the first rear-mounted gear set (NR1) via a third free-wheel clutch (F3) of the at least three free-wheel clutches (F1, F2, F3, F4);

the ring gear (21) of the first rear-mounted gear set (NR1) is connected to a planet carrier (23) of the second rear-mounted gear set (NR2);

a sun gear (22) of the second rear-mounted gear set (NR2) is connected to the transmission output shaft (2) and is connectable to a ring gear (24) of the second rear-mounted gear set (NR2) via a fourth free-wheel clutch (F4) of the at least three free-wheel clutches (F1, F2, F3, F4); and the ring gear (24) of the second rear-mounted gear set (NR2) is fixable via a fourth brake (B4) of the at least three brakes (B1, B2, B3, B4).

13. The multi-stage transmission of claim 1, wherein:
the at least three planetary gear sets (VRS, VR1, VR2, RS1, RS2, NRS, NR1, NR2) are arranged in an axial sequence of a second front-mounted gear set (VR2), a first front-mounted gear set (VR1), the second planetary gear set (RS2), and the first planetary gear set (RS1);

each of the second front-mounted gear set (VR2) and the second planetary gear set (RS2) comprises a respective stepped planet; and each of the second front-mounted gear set (VR2), the first front-mounted gear set (VR1), the second planetary gear set (RS2), and the first planetary gear set (RS1) is configured as a respective minus planetary gear set.

14. The multi-stage transmission of claim 13, wherein:
the transmission input shaft (1) is connected to a planet carrier (17) of the second front-mounted gear set (VR2) and is connectable to a ring gear (18) of the second front-mounted gear set (VR2) via a fourth free-wheel clutch (F4) of the at least three free-wheel clutches (F1, F2, F3, F4);

a sun gear (16) of the second front-mounted gear set (VR2) is fixable via a fourth brake (B4) of the at least three brakes (B1, B2, B3, B4);

the ring gear (18) of the second front-mounted gear set (VR2) is connected to a planet carrier (14) of the first front-mounted gear set (VR1) and is connectable to a ring gear (15) of the first front-mounted gear set (VR1) via a third free-wheel clutch (F3) of the at least three free-wheel clutches (F1, F2, F3, F4);

a sun gear (13) of the first front-mounted gear set (VR1) is fixable via a third brake (B3) of the at least three brakes (B1, B2, B3, B4);

the ring gear (15) of the first front-mounted gear set (VR1) is connected to the planet carrier (8) of the second planetary gear set (RS2) and is connectable to the ring gear (6) of the first planetary gear set (RS1) via the second free-wheel clutch (F2);

the ring gear (9) of the second planetary gear set (RS2) is connected to the transmission output shaft (2) and is connectable to the sun gear (4) of the first planetary gear set (RS1) via the first free-wheel clutch (F1); and the sun gear (7) of the second planetary gear set (RS2) is connected to the planet carrier (5) of the first planetary gear set (RS1).

15. The multi-stage transmission of claim 1, wherein:
the at least three planetary gear sets (VRS, VR1, VR2, RS1, RS2, NRS, NR1, NR2) are arranged in an axial sequence of a second front-mounted gear set (VR2), a first front-mounted gear set (VR1), the second planetary gear set (RS2), and the first planetary gear set (RS1);

each of the second front-mounted gear set (VR2) and the first front-mounted gear set (VR1) is configured as a respective plus planetary gear set; and each of the second planetary gear set (RS2) and the first planetary gear set (RS1) is configured as a respective minus planetary gear set.

16. The multi-stage transmission of claim 15, wherein:
the transmission input shaft (1) is connected to a ring gear (18) of the second front-mounted gear set (VR2);

a sun gear (16) of the second front-mounted gear set (VR2) is fixable via a fourth brake (B4) of the at least three brakes (B1, B2, B3, B4) and is connectable to a planet carrier (17) of the second front-mounted gear set (VR2) via a fourth free-wheel clutch (F4) of the at least three free-wheel clutches (F1, F2, F3, F4);

the planet carrier (17) of the second front-mounted gear set (VR2) is connected to a ring gear (15) of the first front-mounted gear set (VR1);

the ring gear (15) of the first front-mounted gear set (VR1) is connectable to a planet carrier (14) of the first front-mounted gear set (VR1) via a third free-wheel clutch (F3) of the at least three free-wheel clutches (F1, F2, F3, F4);

a sun gear (13) of the first front-mounted gear set (VR1) is fixable via a third brake (B3) of the at least three brakes (B1, B2, B3, B4);

the planet carrier (14) of the first front-mounted gear set (VR1) is connected to the planet carrier (8) of the second planetary gear set (RS2) and is connectable to the ring gear (6) of the first planetary gear set (RS1) via the second free-wheel clutch (F2); and the ring gear (9) of the second planetary gear set (RS2) is connected to the transmission output shaft (2) and is connectable to the sun gear (4) of the first planetary gear set (RS1) via the first free-wheel clutch (F1).

17. The multi-stage transmission of claim 1, wherein:

the at least three free-wheel clutches (F1, F2, F3, F4) comprises the first free-wheel clutch (F1), the second free-wheel clutch (F2), a third free-wheel clutch (F3), and a fourth free-wheel clutch (F4); and the at least three brakes (B1, B2, B3, B4) comprises the first brake (B1), the second brake (B2), a third brake (B3), and a fourth brake (B4); and in order to shift a first gear (G1), the first, the second, the third, and the fourth brakes (B1, B2, B3, B4) are disengaged, and the first, the second, the third, and the fourth free-wheel clutches (F1, F2, F3, F4) are in a locking direction condition; or in order to shift a second gear (G2), the first brake (B1) is engaged, the second, the third, and the fourth brakes (B2, B3, B4) are disengaged, the first free-wheel clutch (F1) is in an overrun operation condition, and the second, the third, and the fourth free-wheel clutches (F2, F3, F4) are in the locking direction condition; or in order to shift a third gear (G3), the second brake (B2) is engaged, the first, the third, and the fourth brakes (B1, B3, B4) are disengaged, the second free-wheel clutch (F2) is in the overrun operation condition, and the first, the third, and the fourth free-wheel clutches (F1, F3, F4) are in the locking direction condition; or in order to shift a fourth gear (G4), the first and the second brakes (B1, B2) are engaged, the third and the fourth brakes (B3, B4) are disengaged, the first and the second free-wheel clutches (F1, F2) are in the overrun operation condition, and the third and the fourth free-wheel clutches (F3, F4) are in the locking direction condition; or in order to shift a fifth gear (G5), the third brake (B3) is engaged, the first, the second, and the fourth brakes (B1, B2, B4) are disengaged, the first, the second, and the fourth free-wheel clutches (F1, F2, F4) are in the locking direction condition, and the third free-wheel clutch (F3) is in the overrun operation condition; or in order to shift a sixth gear (G6), the first and the third brakes (B1, B3) are engaged, the second and the fourth brakes (B2, B4) are disengaged, the first and the third free-wheel clutches (F1, F3) are in the overrun operation condition, and the second and the fourth free-wheel clutches (F2, F4) are in the locking direction condition; or in order to shift a seventh gear (G7), the first and the fourth brakes (B1, B4) are disengaged, the second and the third brakes (B2, B3) are engaged, the first and the fourth free-wheel clutches (F1, F4) are in the locking direction condition, and the second and the third free-wheel clutches (F2, F3) are in the overrun operation condition; or in order to shift an eighth gear (G8), the first, the second, and the third brakes (B1, B2, B3) are engaged, the fourth brake (B4) is disengaged, the first, the second, and the third free-wheel clutches (F1, F2, F3) are in the overrun operation condition, and the fourth free-wheel clutch (F4) is in the locking direction condition; or in order to shift a ninth gear (G9), the first, the second, and the third brakes (B1, B2, B3) are disengaged, the fourth brake (B4) is engaged, the first, the second, and the third free-wheel clutches (F1, F2, F3) are in the locking direction condition, and the fourth free-wheel clutch (F4) is in the overrun operation condition; or in order to shift a tenth gear (G10), the first and the fourth brakes (B1, B4) are engaged, the second and the third brakes (B2, B3) are disengaged, the first and the fourth free-wheel clutches (F1, F4) are in the overrun operation condition, and the second and the third free-wheel clutches (F2, F3) are in the locking direction condition; or in order to shift an eleventh gear (G11), the first and the third brakes (B1, B3) are disengaged, the second and the fourth brakes (B2, B4) are engaged, the first and the third free-wheel clutches (F1, F3) are in the locking direction condition, and the second and the fourth free-wheel clutches (F2, F4) are in the overrun operation condition; or in order to shift a twelfth gear (G12), the first, the second, and the fourth brakes (B1, B2, B4) are engaged, the third brake (B3) is disengaged, the first, the second, and the fourth free-wheel clutches (F1, F2, F4) are in the overrun operation condition, and the third free-wheel clutch (F3) is in the locking direction condition; or in order to shift a thirteenth gear (G13), the first and the second brakes (B1, B2) are disengaged, the third and the fourth brakes (B3, B4) are engaged, the first and the second free-wheel clutches (F1, F2) are in the locking direction condition, and the third and the fourth free-wheel clutches (F3, F4) are in the overrun operation condition; or in order to shift a fourteenth gear (G14), the first, the third, and the fourth brakes (B1, B3, B4) are engaged, the second brake (B2) is disengaged, the first, the third, and the fourth free-wheel clutches (F1, F3, F4) are in the overrun operation condition, and the second free-wheel clutch (F2) is in the locking direction condition; or in order to shift a fifteenth gear (G15), the first brake (B1) is disengaged, the second, the third, and the fourth brakes (B2, B3, B4) are engaged, the first free-wheel clutch (F1) is in the locking direction condition, and the second, the third, and the fourth free-wheel clutches (F2, F3, F4) are in the overrun operation condition; or in order to shift a sixteenth gear (G16), the first, the second, the third, and the fourth brakes (B1, B2, B3, B4) are engaged, and the first, the second, the third, and the fourth free-wheel clutches (F1, F2, F3, F4) are in the overrun operation condition.

18. The multi-stage transmission of claim 1, wherein:

the at least three planetary gear sets (VRS, VR1, VR2, RS1, RS2, NRS, NR1, NR2) are arranged in an axial sequence of the front-mounted gear set (VRS), the second planetary gear set (RS2), and the first planetary gear set (RS1); and each of the front-mounted gear set (VRS), the second planetary gear set (RS2), and the first planetary gear set (RS1) is configured as a respective minus planetary gear set.

19. The multi-stage transmission of claim 18, wherein:
the transmission input shaft (1) is connected to a planet carrier (11) of the front-mounted gear set (VRS);
a sun gear (10) of the front-mounted gear set (VRS) is fixable via a third brake (B3) of the at least three brakes (B1, B2, B3, B4) and is connectable to a ring gear (12) of the front-mounted gear set (VRS) via a third free-wheel clutch (F3) of the at least three free-wheel clutches (F1, F2, F3, F4);
the ring gear (12) of the front-mounted gear set (VRS) is connected to the planet carrier (8) of the second planetary gear set (RS2) and is connectable to the ring gear (6) of the first planetary gear set (RS1) via the second free-wheel clutch (F2);
the ring gear (9) of the second planetary gear set (RS2) is connected to the transmission output shaft (2) and is connectable to the sun gear (4) of the first planetary gear set (RS1) via the first free-wheel clutch (F1); and
the sun gear (7) of the second planetary gear set (RS2) is connected to the planet carrier (5) of the first planetary gear set (RS1).

20. The multi-stage transmission of claim 18, wherein:
the at least three free-wheel clutches (F1, F2, F3, F4) comprises the first free-wheel clutch (F1), the second free-wheel clutch (F2), and a third free-wheel clutch (F3); and
the at least three brakes (B1, B2, B3, B4) comprises the first brake (B1), the second brake (B2), and a third brake (B3); and
in order to shift a first gear (G1), the first, the second, and the third brakes (B1, B2, B3) are disengaged, and the first, the second, and the third free-wheel clutches (F1, F2, F3) are in a locking direction condition; or
in order to shift a second gear (G2), the first brake (B1) is engaged, the second and the third brakes (B2, B3) are disengaged, the first free-wheel clutch (F1) is in an overrun operation condition, and the second and the third free-wheel clutches (F2, F3) are in the locking direction condition; or
in order to shift a third gear (G3), the second brake (B2) is engaged, the first and the third brakes (B1, B3) are disengaged, the second free-wheel clutch (F2) is in the overrun operation condition, and the first and the third free-wheel clutches (F1, F3) are in the locking direction condition; or
in order to shift a fourth gear (G4), the first and the second brakes (B1, B2) are engaged, the third brake (B3) is disengaged, the first and the second free-wheel clutches (F1, F2) are in the overrun operation condition, and the third free-wheel clutch (F3) is in the locking direction condition; or
in order to shift a fifth gear (G5), the third brake (B3) is engaged, the first and the second brakes (B1, B2) are disengaged, the first and the second free-wheel clutches (F1, F2) are in the locking direction condition, and the third free-wheel clutch (F3) is in the overrun operation condition; or
in order to shift a sixth gear (G6), the first and the third brakes (B1, B3) are engaged, the second brake (B2) is disengaged, the first and the third free-wheel clutches (F1, F3) are in the overrun operation condition, and the second free-wheel clutch (F2) is in the locking direction condition; or in order to shift a seventh gear (G7), the first brake (B1) is disengaged, the second and the third brakes (B2, B3) are engaged, the first free-wheel clutch (F1) is in the locking direction condition, and the second and the third free-wheel clutches (F2, F3) are in the overrun operation condition; or
in order to shift an eighth gear (G8), the first, the second, and the third brakes (B1, B2, B3) are engaged, and the first, the second, and the third free-wheel clutches (F1, F2, F3) are in the overrun operation condition.

21. The multi-stage transmission of claim 1 wherein:
the at least three planetary gear sets (VRS, VR1, VR2, RS1, RS2, NRS, NR1, NR2) are arranged in an axial sequence of a second front-mounted gear set (VR2), a first front-mounted gear set (VR1), the second planetary gear set (RS2), and the first planetary gear set (RS1); and
each of the second front-mounted gear set (VR2), the first front-mounted gear set (VR1), the second planetary gear set (RS2), and the first planetary gear set (RS1) is configured as a respective minus planetary gear set.

22. The multi-stage transmission of claim 21, wherein:
the transmission input shaft (1) is connected to a planet carrier (17) of the second front-mounted gear set (VR2);
a sun gear (16) of the second front-mounted gear set (VR2) is connected to a planet carrier (14) of the first front-mounted gear set (VR1) and is connectable to a ring gear (18) of the second front-mounted gear set (VR2) via a fourth free-wheel clutch (F4) of the at least three free-wheel clutches (F1, F2, F3, F4);
the ring gear (18) of the second front-mounted gear set (VR2) is fixable via a fourth brake (B4) of the at least three brakes (B1, B2, B3, B4);
a sun gear (13) of the first front-mounted gear set (VR1) is fixable via a third brake (B3) of the at least three brakes (B1, B2, B3, B4) and is connectable to the planet carrier (14) of the first front-mounted gear set (VR1) via a third free-wheel clutch (F3) of the at least three free-wheel clutches (F1, F2, F3, F4);
a ring gear (15) of the first front-mounted gear set (VR1) is connected to the planet carrier (8) of the second planetary gear set (RS2) and is connectable to the ring gear (6) of the first planetary gear set (RS1) via the second free-wheel clutch (F2);
the ring gear (9) of the second planetary gear set (RS2) is connected to the transmission output shaft (2) and to the sun gear (4) of the first planetary gear set (RS1); and
the sun gear (7) of the second planetary gear set (RS2) is connected to the planet carrier (5) of the first planetary gear set (RS1).

23. The multi-stage transmission of claim 22, wherein:
the at least three free-wheel clutches (F2, F3, F4) comprises the second free-wheel clutch (F2), a third free-wheel clutch (F3), and a fourth free-wheel clutch (F4); and
the at least three brakes (B1, B2, B3, B4) comprises the second brake (B2), a third brake (B3), and a fourth brake (B4); and
in order to shift a first gear (G1), the second, the third, and the fourth brakes (B2, B3, B4) are disengaged, and the second, the third, and the fourth free-wheel clutches (F2, F3, F4) are in a locking direction condition; or
in order to shift a second gear (G2), the second brake (B2) is engaged, the third and the fourth brakes (B3, B4) are disengaged, the second free-wheel clutch (F2) is in an overrun operation condition, and the third and the fourth free-wheel clutches (F3, F4) are in the locking direction condition; or in order to shift a third gear (G3), the third brake (B3) is engaged, the second and the fourth brakes (B2, B4) are disengaged, the third free-wheel clutch (F3) is in the overrun operation condition, and the second and the fourth free-wheel clutches (F2, F4) are in the locking direction condition; or in order to shift a fourth gear (G4), the second and the third brakes (B2, B3) are engaged, the fourth brake (B4) is disengaged, the second and the third free-wheel clutches (F2, F3) are in the overrun operation condition, and the fourth free-wheel clutch (F4) is in the locking direction condition; or in order to shift a fifth gear (G5), the fourth brake (B4) is engaged, the second and the third brakes (B2, B3) are disengaged, the second and the third free-wheel clutches (F2, F3) are in the locking direction condition, and the fourth free-wheel clutch (F4) is in the overrun operation condition; or in order to shift a sixth gear (G6), the second and the fourth brakes (B2, B4) are engaged, the third brake (B3) is disengaged, the second and the fourth free-wheel clutches (F2, F4) are in the overrun operation condition, and the third free-wheel clutch (F3) is in the locking direction condition; or in order to shift a seventh gear (G7), the second brake (B2) is disengaged, the third and the fourth brakes (B3, B4) are engaged, the second free-wheel clutch (F2) is in the locking direction condition, and the third and the fourth free-wheel clutches (F3, F4) are in the overrun operation condition; or in order to shift an eighth gear (G8), the second, the third, and the fourth brakes (B2, B3, B4) are engaged, and the second, the third, and the fourth free-wheel clutches (F2, F3, F4) are in the overrun operation condition.

24. The multi-stage transmission of claim 1, wherein the multi-stage transmission is configured as a bottom bracket transmission with the at least three planetary gear sets (VRS, VR1, VR2, RS1, RS2, NRS, NR1, NR2) arranged coaxially.

25. A bicycle, comprising the multi-stage transmission of claim 1.

* * * * *